(12) United States Patent
Zhu et al.

(10) Patent No.: US 7,635,934 B2
(45) Date of Patent: *Dec. 22, 2009

(54) FAN AND MOTOR THEREOF

(75) Inventors: Micheas Zhu, Taoyuan Hsien (TW); Deng-Chu Fu, Taoyuan Hsien (TW); Yung-Ping Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 29 days.

This patent is subject to a terminal disclaimer.

(21) Appl. No.: 11/640,890

(22) Filed: Dec. 19, 2006

(65) Prior Publication Data

US 2007/0145842 A1 Jun. 28, 2007

(30) Foreign Application Priority Data

Dec. 23, 2005 (TW) .............................. 94145982 A

(51) Int. Cl.
H02K 5/10 (2006.01)

(52) U.S. Cl. ...................................................... 310/88
(58) Field of Classification Search .................. 310/88, 310/64, 58, 62, 67 R; 417/423.1, 423.8, 417/354
See application file for complete search history.

(56) References Cited

U.S. PATENT DOCUMENTS

| 5,952,751 | A | * | 9/1999 | Yamakoshi et al. | ............ 310/89 |
| 6,278,207 | B1 | * | 8/2001 | Matsumoto | ................... 310/88 |
| 2005/0012416 | A1 | | 1/2005 | Huang et al. | |

* cited by examiner

*Primary Examiner*—Renee S Luebke
*Assistant Examiner*—Sean Kayes
(74) *Attorney, Agent, or Firm*—Birch, Stewart, Kolasch & Birch, LLP

(57) ABSTRACT

A fan structure includes a frame, a cover, a stator structure and a base. The cover and the frame are integrally formed as a single piece. The stator structure is disposed in the cover and the base is connected to the cover. Thus, the stator structure is located between the cover and the base.

21 Claims, 5 Drawing Sheets

US 7,635,934 B2

FAN AND MOTOR THEREOF

CROSS-REFERENCE TO RELATED APPLICATIONS

This Non-provisional application claims priority under 35 U.S.C. §119(a) on Patent Application No(s). 094145982 filed in Taiwan, Republic of China on Dec. 23, 2005, the entire contents of which are hereby incorporated by reference.

BACKGROUND OF THE INVENTION

1. Field of Invention

The invention relates to a fan and the motor thereof, and, in particular, to a water-proof fan and the motor thereof.

2. Related Art

Accompanying with the development of technology, the electronic devices have a trend toward high-speed, function-integrated, and compactified. However, the higher the integrity of the electronic element is, the more heat the electronic device generates. The generated heat may lead to the unstable of the electronic device and thus reduce the reliability of the electronic device. Consequently, the heat dissipation is an important issue in this industry. In present, a fan is commonly used as a heat-dissipating unit for the electronic device. The fan usually includes a frame, a stator structure, and a rotor structure. The stator structure is directly mounted in the frame. Therefore, the coil, circuit board, and other components of the stator structure are directly exposed to the air. Since these elements are not protected, moisture or dusts in the air may damage and dampen them, or even burn off the circuit. Accordingly, the electronic device may malfunction.

Although a protective layer coated on the surface of the stator structure is proposed in the prior art to protect the stator structure from water and dusts in the air, the thickness of the protective layer is only a few tens of microns due to the limitation of current technologies and device structures. Therefore, the protection effect is limited whereas the cost is high.

Therefore, it is an important subject to provide a fan with better water-proof and dust-proof effects at a lower cost and a motor thereof.

SUMMARY OF THE INVENTION

In view of the foregoing, the invention is to provide a fan with better water-proof and dust-proof effects at a lower cost and the motor thereof.

To achieve the above, a fan of the invention includes a frame, a cover, a stator structure, and a base. The cover and the frame are integrally formed. The stator structure is disposed in the cover, and the base is connected to the cover so that the stator structure is located between the cover and the base.

To achieve the above, a motor of the invention includes a cover, a stator structure, and a base. The stator structure is disposed in the cover. The base is connected with the cover, so that the stator structure is located between the cover and the base. The cover may further be integrally formed with the frame.

As mentioned above, the fan and motor of the invention have integrally formed cover and frame and a stator structure disposed in the cover. A base is then connected to the cover. Using this structure not only prevents the stator structure from exposing to the air or moisture, but also achieves water-proof and dust-proof effects at a lower cost. Moreover, a filler may be inserted between the cover and the base so as to cover the stator structure. Different fillers may achieve different elastic, vibration absorbing, and heat dissipating effects. Therefore, the fan and motor of the invention may have the additional effects of absorbing vibrations, reducing noises, and dissipating heat, which enhance the practicality of the fan.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
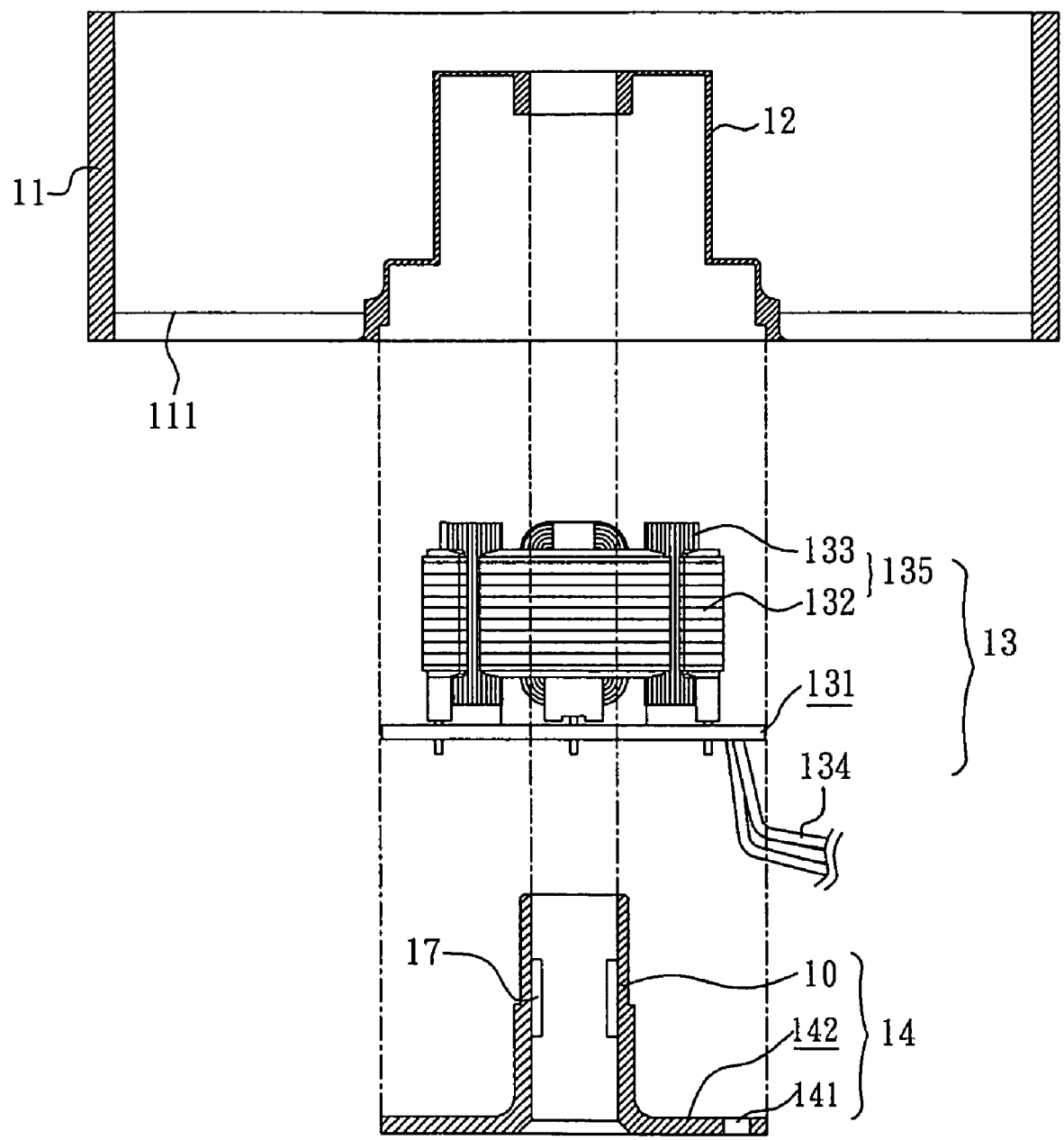
FIG. 1 is an exploded view of a motor according to a preferred embodiment of the invention, which is used in an axial-flow fan.
Figure 2:
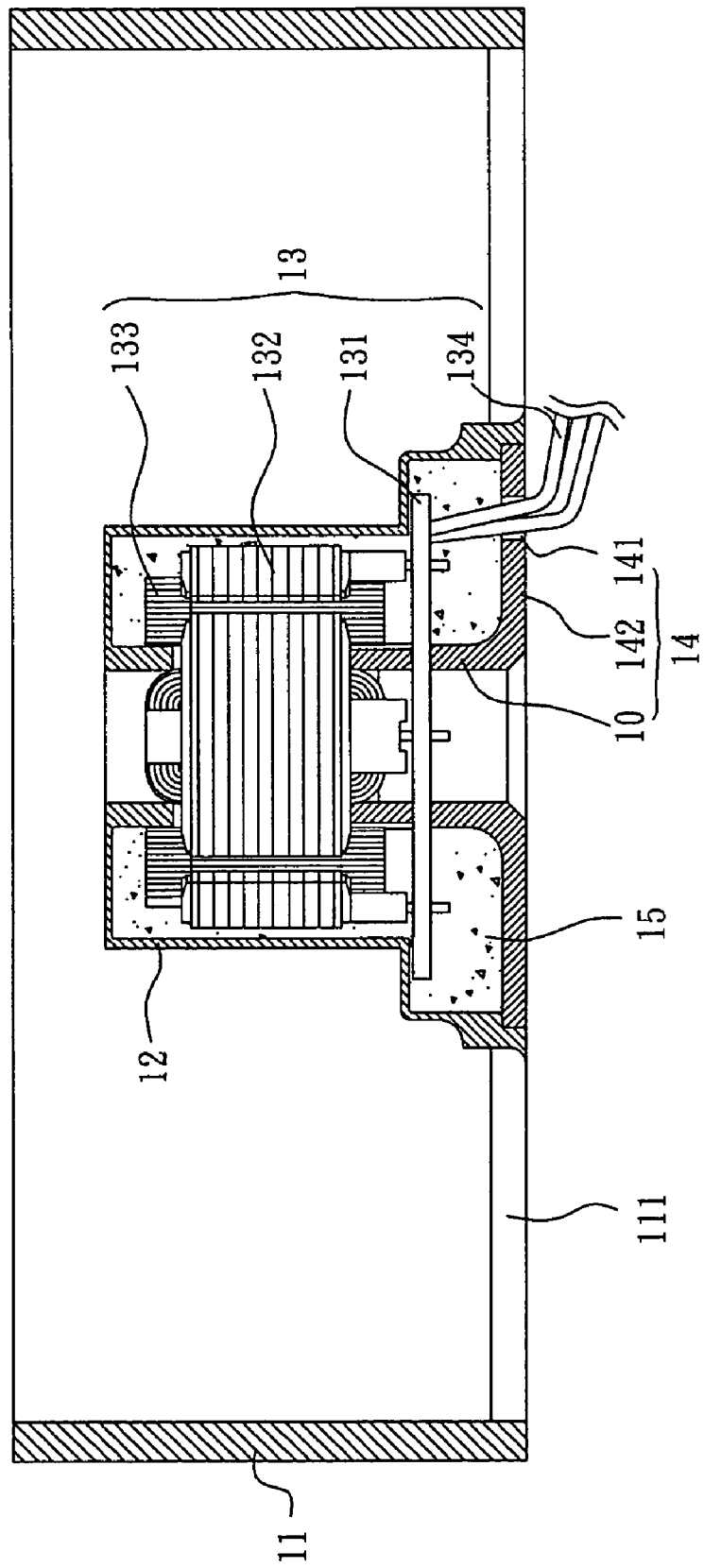
FIG. 2 is an assembly view of the motor in the axial-flow fan.

With reference to FIGS. 1 and 2, a fan 1 according to a preferred embodiment of the invention includes a frame 11, a cover 12, a stator structure 13, and a base 14. The cover 12, the stator structure 13, and the base 14 are some components of a motor. In this embodiment, the materials of the frame 11, cover 12, and base 14 of the fan 1 can be the same or different. For example, the frame, the cover, or the base can be made of a plastic material, an acrylic material, a metal material, an alloy, or a water-proof material.

The cover 12 is connected with the frame 11 by at least one supporting member 111. The cover 12 and the frame 11 are integrally formed as a single piece. Moreover, the cover 12, the supporting member 111 and the frame 11 may be integrally formed. In this embodiment, the supporting member 111 can be a rib or a stationary blade.

The stator structure 13 includes a circuit board 131 and a stator magnetic pole 135 composed of at least a silicon steel sheet 132 and at least one coil 133 wound around the silicon steel sheet 132. The circuit board 131 includes at least a wire 134 for electrically connecting with an external system. The circuit board 131 is electrically coupled with the stator magnetic pole 135 or the coil 133 in order to change the polarity of the stator magnetic pole 135. The stator structure 13 is disposed inside the cover 12.

The base 14 has an opening 141 for passing the wire 134 of the stator structure 13 therethrough. The opening 141 can be sealed with some sealant after the fan 1 is assembled to prevent moisture or dusts from entering the stator structure 13. Besides, the opening 141 can be formed on the cover 12 or simultaneously formed on the cover 12 and the base 14 according to the actual needs.

In this embodiment, the size of the base 14 is larger than or equal to the size of the circuit board 131 of the stator structure 13. When the base 14 is connected with the cover 12, the stator structure 13 is completely covered by the base 14 and the cover 12. The stator structure 13 is telescoped onto an axial tube 10 of the base 14 for firmly fixing the stator structure 13 on the base 14. In addition, as shown in FIG. 1, the base 14 further has a bottom portion 142 connected to the axial tube 10. Moreover, in this embodiment, the base 14 and the cover 12 are connected by screw fastening, buckling, wedging, or locking. They can also be connected by soldering, thermal welding, or ultrasonic welding. The axial tube 10 is connected to the bottom portion 142 of the base 14 by wedging, soldering, thermal welding, or ultrasonic welding. The inner wall of the axial tube 10 may include a stopper 17 as a limiting structure of a bearing (not shown).

With reference to FIG. 2, a filler 15 is further applied between the cover 12 and the base 14. The filler 15 is a non-conductive filler, which can be an elastic material, a vibration-absorbing material, or a thermal conductive material. For example, it can be, but not limited to, epoxy, silicone, or PU gel. To prevent the liquid filler from producing bubbles or gaps while filling through the opening 141, the connected cover 12, stator structure 13, and base 14 can be vacuum processed in advance. The filler 15 is then applied into the space between the cover 12, the stator structure 13, and the base 14 in a vacuum environment. Consequently, the stator structure 13 achieves a better protection from moisture and dusts. Because the filler 15 has the elasticity, vibration absorption or thermal conductivity effect, the fan can absorb vibrations, reduce noises or has better heat dissipation. Moreover, the filler 15 can be filled after the cover 12, the stator structure 13, and the base 14 finish assembling. It can also be filled into the cover 12 before the stator structure 13 is disposed inside the cover 12, followed by the connection of the cover 12 and the base 14.

Figure 3:
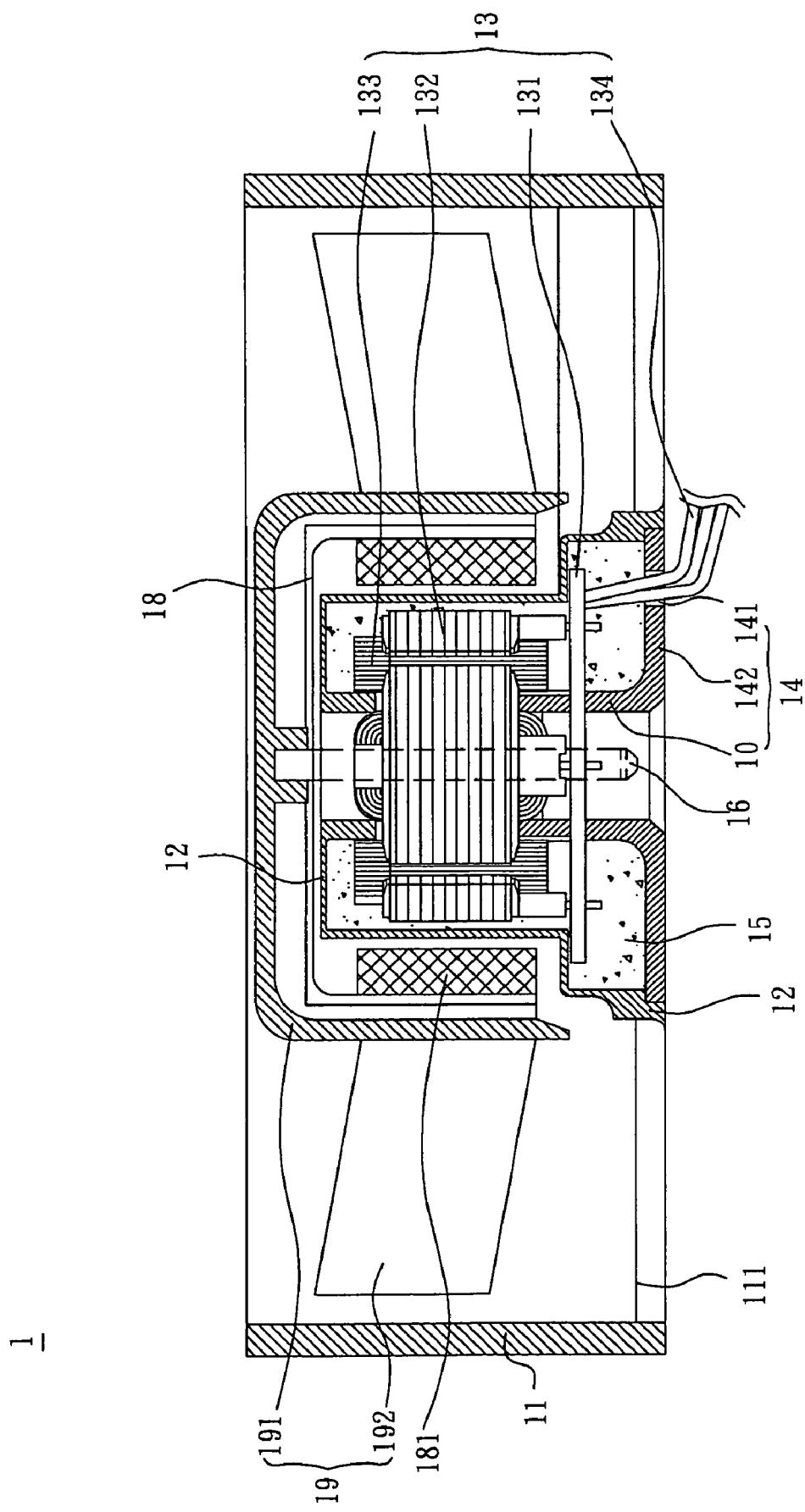
FIG. 3 is a schematic view of another motor according to a preferred embodiment of the invention, which is used in an axial-flow fan.

As shown in FIG. 3, the fan 1 may further include a rotor structure 18 and an impeller 19 coupled to the rotor structure 18. The rotor structure 18 has at least one magnetic component 181 corresponding to the stator magnetic pole 135. The impeller 19 has a hub 191 and several blades 192, each of which is mounted around the hub 191. Besides, the fan 1 can further have a shaft 16 inserted into the axial tube 10 and coupled to the rotor structure 18.

Figure 4:
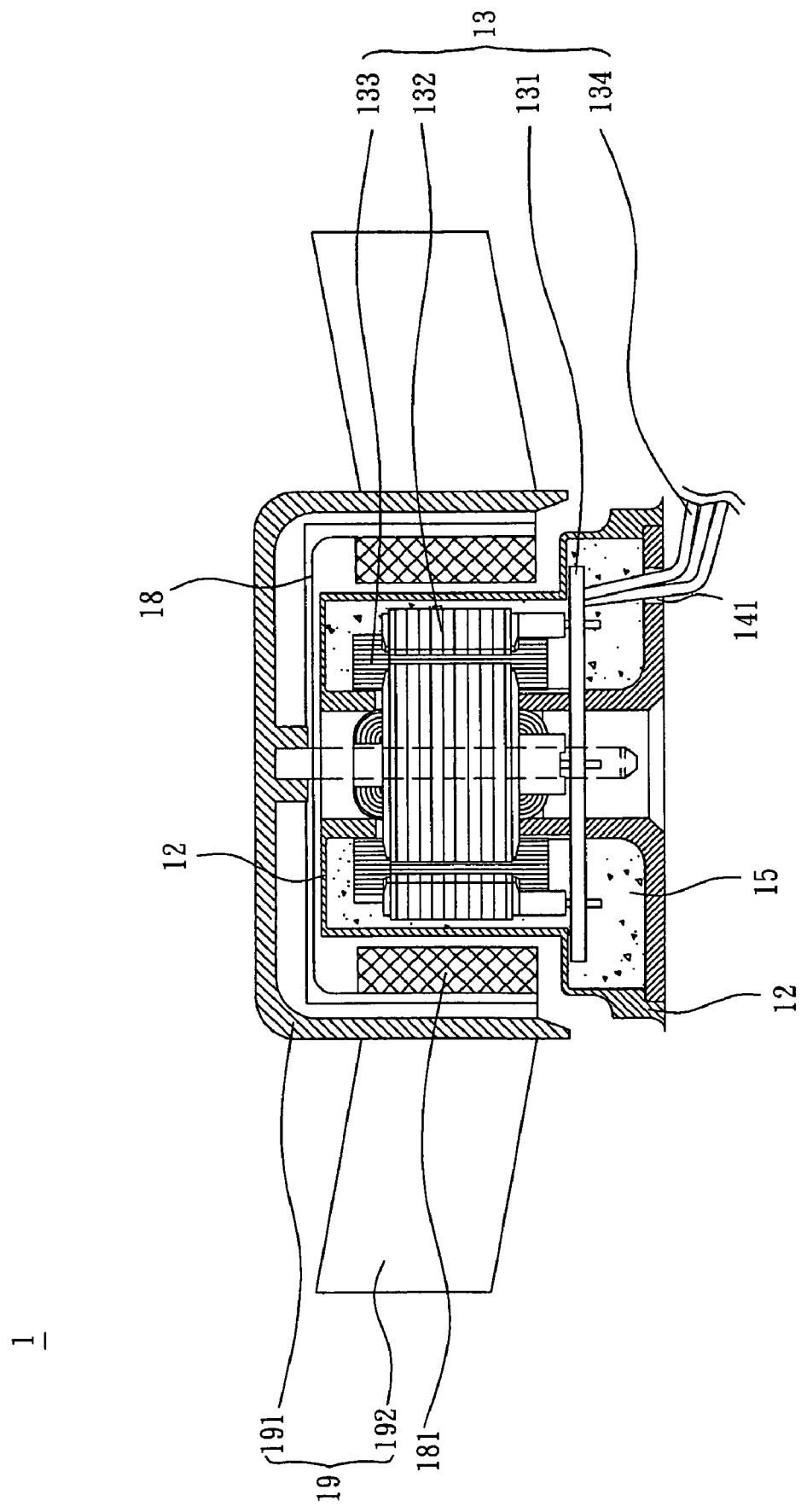
FIG. 4 is a schematic view of a motor according to a preferred embodiment of the invention.

With reference to FIG. 4, the cover 12, the stator structure 13, the base 14, and the rotor structure 18 in this embodiment combine to form a motor or even a fan motor. As shown in FIG. 4, a filler 15 may be applied between the cover 12 and the base 14, so that the motor has better performance in absorbing vibrations, reducing noises, and dissipating heat.

Figure 5:
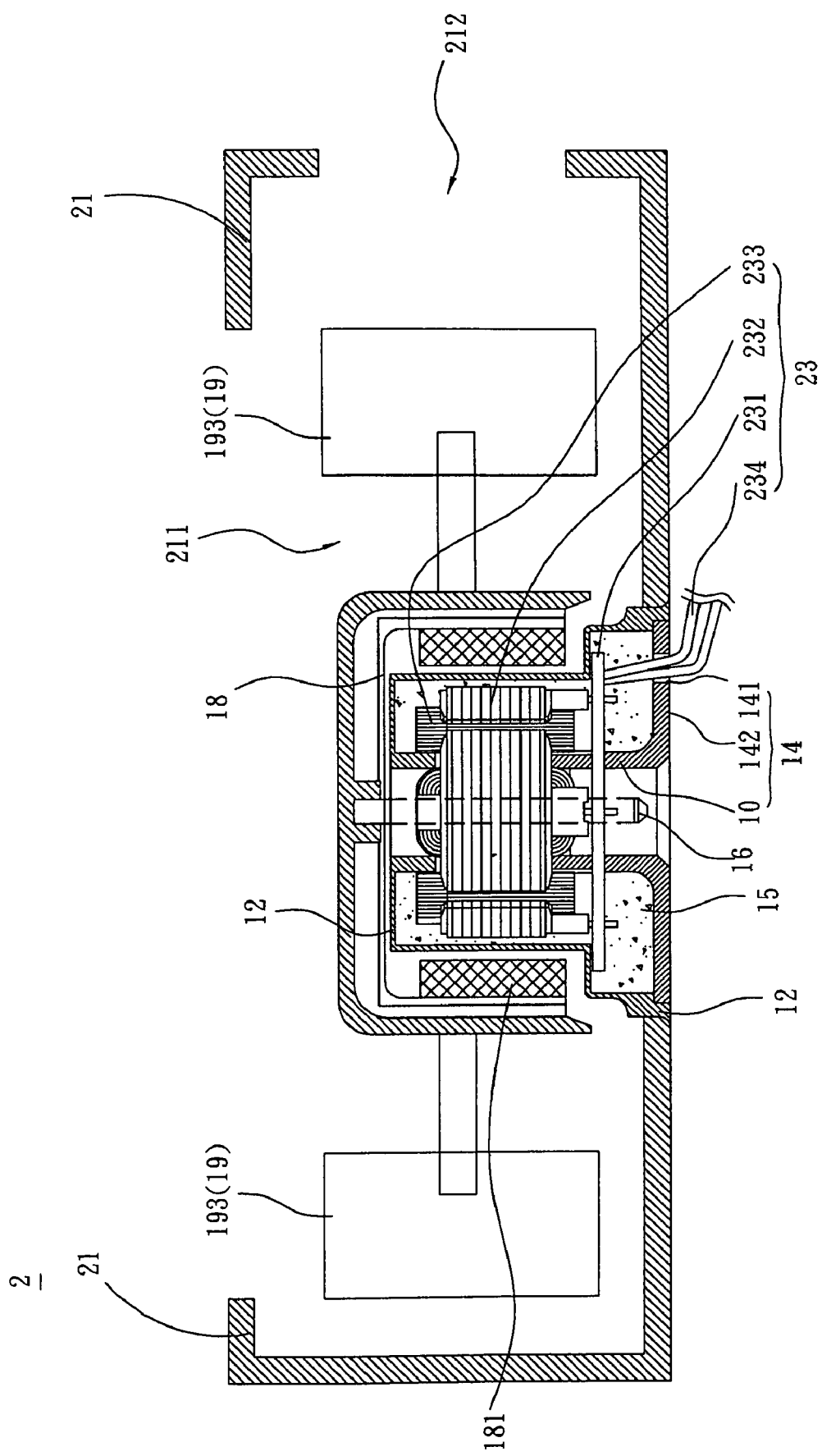
FIG. 5 is a schematic view of a motor according to a preferred embodiment of the invention, which is used in a centrifugal fan.

Aside from the axial-flow fan as described above, other embodiments of the invention include the centrifugal fan, internal rotor fan, and external rotor fan. With reference to FIG. 5, the compositions of a centrifugal fan 2 that are the same as the above-mentioned axial-flow fan 1 have the same reference numerals, so the detailed descriptions thereof are omitted for concise purpose. The difference between the centrifugal fan 2 and the axial-flow fan 1 is in that the centrifugal fan 2 uses the rotor 18 to drive the blades 193, sucking air in via an inlet 211 of the frame 21 and blowing it out via a radial outlet 212 of the frame 21.

In summary, the fan and motor of the invention have integrally formed cover and frame and a stator structure disposed in the cover. A base is then connected to the cover. Using this structure not only prevents the stator structure from exposing to the air or moisture, but also achieves water-proof and dust-proof effects at a lower cost. Moreover, a filler may be inserted between the cover and the base so as to cover the stator structure. Different fillers may achieve different elastic, vibration absorbing, and heat dissipating effects. Therefore, the fan and motor of the invention may have the additional effects of absorbing vibrations, reducing noises, and dissipating heat, which enhance the practicality of the fan.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fan comprising:
   a frame including a cover, wherein the cover is integrally formed within the frame as a single piece;
   a stator structure disposed in the cover;
   a base connected to the cover, wherein the stator structure is located between the cover and the base;
   a rotor structure disposed outside the cover and received in the frame; and
   a filler applied in a space between the base and the cover to fully cover the stator structure.

2. The fan of claim 1, wherein the rotor structure has at least one magnetic component, and wherein the stator structure comprises a stator magnetic pole and a circuit board electrically coupled with the stator magnetic pole, and the stator magnetic pole is corresponding to the magnetic component.

3. The fan of claim 2, wherein the stator magnetic pole comprises at least one silicon steel sheet and at least one coil wound around the silicon steel sheet and electrically coupled with the circuit board.

4. The fan of claim 2, wherein the size of the base is larger than or equal to that of the circuit board.

5. The fan of claim 2, wherein both or either of the base and the cover has an opening, and at least one wire connecting to the circuit board passes through the opening.

6. The fan of claim 2, further comprising an impeller coupled to the rotor structure, wherein the impeller has a hub and at least one blade disposed around the hub.

7. The fun of claim 2, wherein the base further comprises:
   an axial tube, wherein the stator structure is telescoped onto the axial tube; and
   a bottom portion connected to the axial tube.

8. The fan of claim 7, wherein the axial tube is connected to the bottom portion of the base by wedging, soldering, thermal welding, or ultrasonic welding.

9. The fan of claim 7, further comprising:
   a shaft inserted inside the axial tube and coupled to the rotor structure.

10. The fan of claim 1, wherein the frame, the cover, or the base is made of a plastic material, an acrylic material, a metal material, an alloy, or a water-proof material.

11. The fan of claim 1, wherein the cover and the base are connected by screw fastening, buckling, wedging, locking, soldering, thermal welding or ultrasonic welding.

12. The fan of claim 1, wherein the filler is a non-conductive material, an elastic material, a vibration-absorbing material, a thermal conductive material, epoxy, silicone, rubber or PU gel.

13. The fan of claim 12, wherein the filler is applied by a vacuum filling process.

14. The fan of claim 1, wherein the cover is connected to the frame by using at least one supporting member, and the cover, the supporting member, and the frame are integrally formed as a single piece.

15. The fan of claim 14, wherein the supporting member is a rib or a stationary blade.

16. A motor comprising:
   a frame including a cover, wherein the cover is integrally formed within the frame as a single piece;
   a stator structure disposed in the cover;

a base connected to the cover, wherein the stator structure is located between the cover and the base;

a rotor structure disposed outside the cover; and a filler applied in a space between the base and the cover to fully cover the stator structure.

17. The motor of claim 16, wherein the rotor structure has at least one magnetic component, and wherein the stator structure comprises a stator magnetic pole and a circuit board electrically coupled with the stator magnetic pole, and the stator magnetic pole is corresponding to the magnetic component.

18. The motor of claim 17, wherein both or either of the base and the cover has an opening, and at least one wire connecting to the circuit board passes through the opening.

19. The motor of claim 16, wherein the cover or the base is made of a plastic material, an acrylic material, a metal material, an alloy or a water-proof material.

20. The motor of claim 16, wherein the filler is a non-conductive material, an elastic material, a vibration-absorbing material, a thermal conductive material, epoxy, silicone, rubber or PU gel.

21. A motor comprising:

a frame including a cover, wherein the cover is integrally formed within the frame as a single piece;

a stator structure disposed in the cover;

a base connected to the cover, wherein the stator structure is located between the cover and the base; and a filler applied into a space between the cover, the stator structure and the base to fully cover the stator structure.

* * * * *